Patented June 3, 1924.

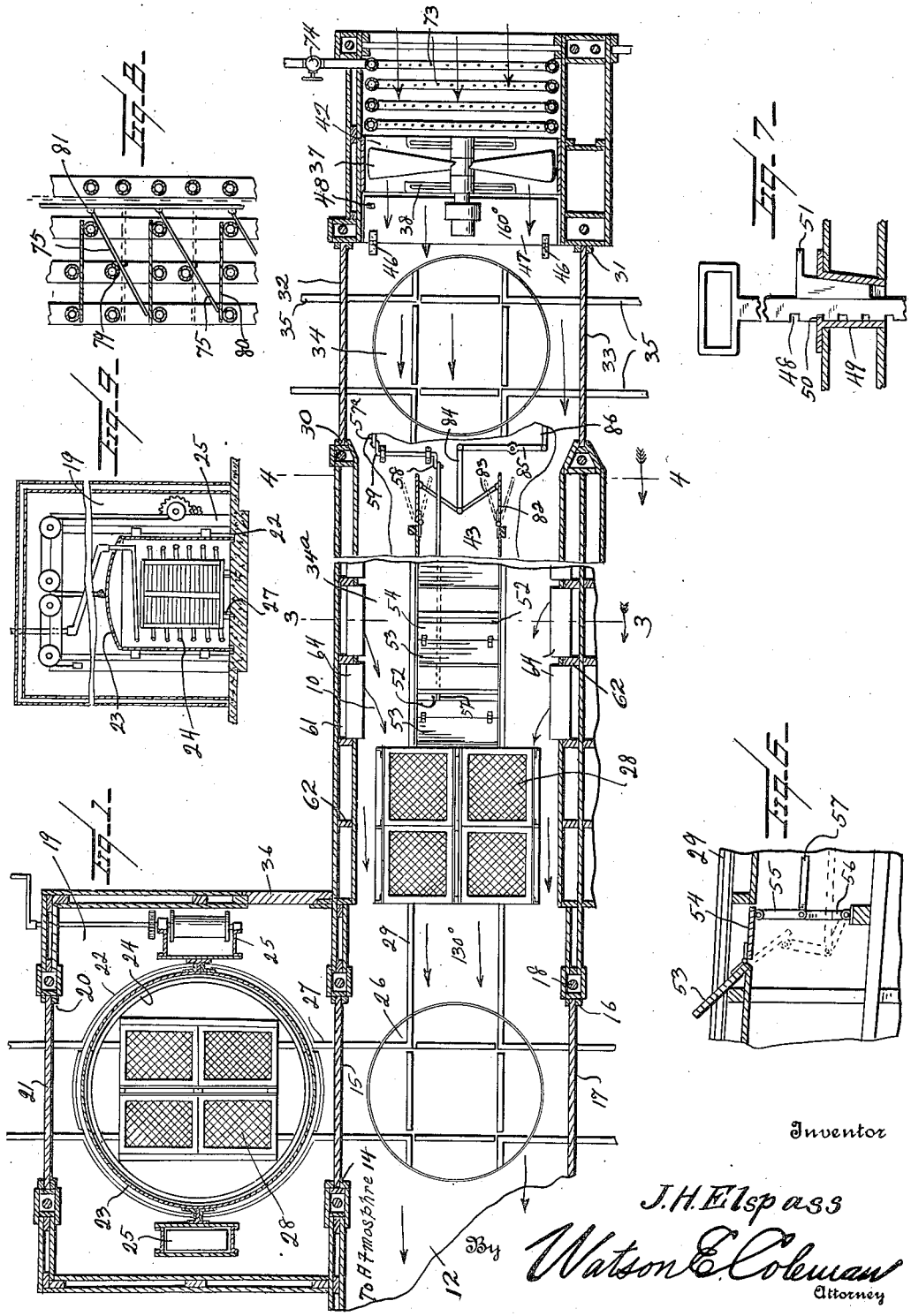

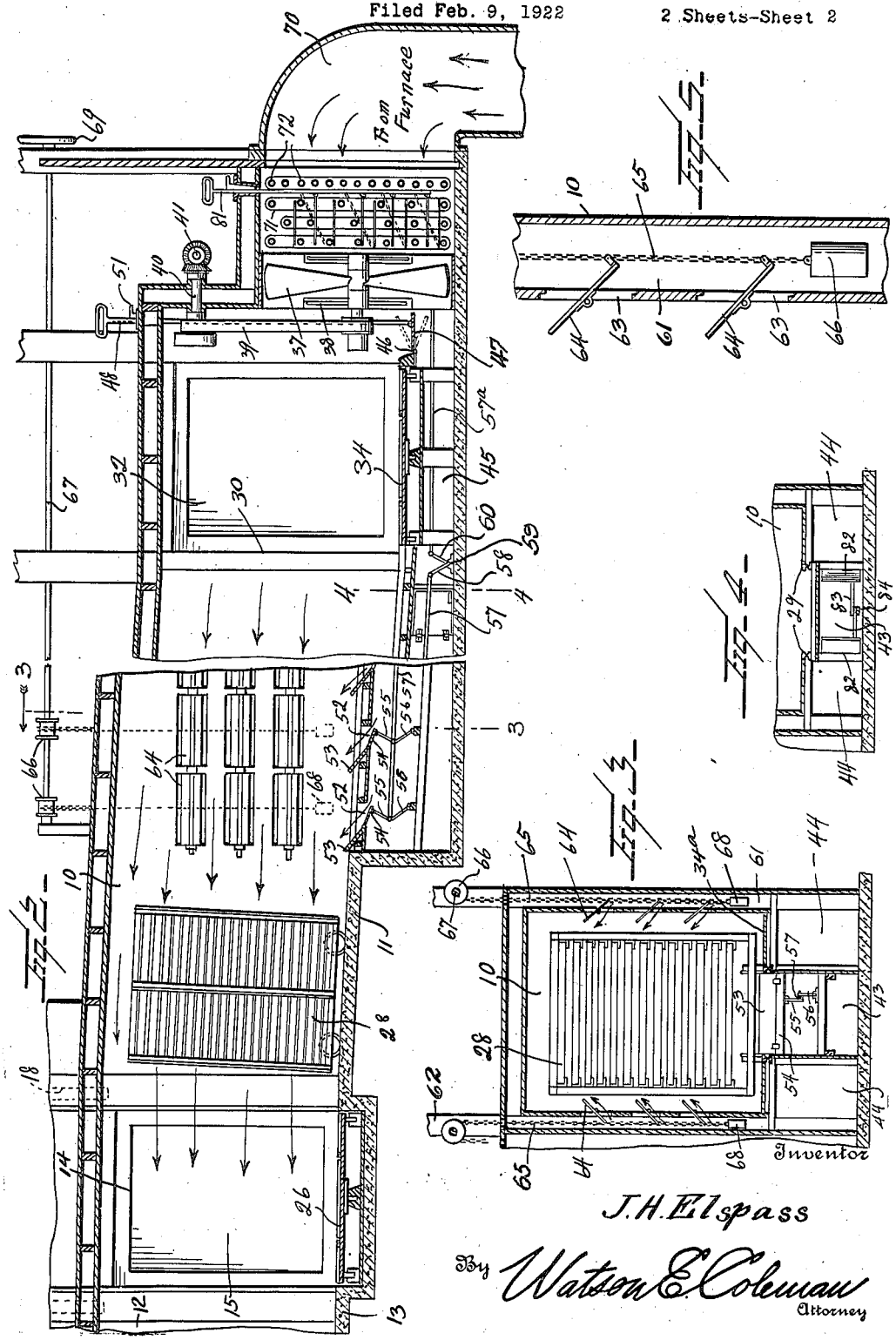

1,496,370

UNITED STATES PATENT OFFICE.

JOHN H. ELSPASS, OF WICHITA, KANSAS, ASSIGNOR OF ONE-THIRD TO M. JOSEPHINE MALONEY, OF OKLAHOMA CITY, OKLAHOMA.

APPARATUS FOR DEHYDRATING.

Application filed February 9, 1922. Serial No. 535,421.

*To all whom it may concern:*

Be it known that I, JOHN H. ELSPASS, a citizen of the United States, residing at Wichita, in the county of Sedgwick and State of Kansas, have invented certain new and useful Improvements in Apparatus for Dehydrating, of which the following is a specification, reference being had to the accompanying drawings.
This invention relates to the art of drying and preserving fruit, vegetables and other food materials by dehydration, and particularly to a dehydrating tunnel, as it is called, along which trucks carrying trays holding layers of sliced vegetables, fruit, etc., travel and while so travelling are subjected to a current of heated air to thereby evaporate the moisture from the fruits, vegetables, etc., and dry the same.
Dehydrating tunnels are in general use, but those of which I am aware are open to several disadvantages. The tunnels are relatively long and the heated air which is discharged into one end of the tunnel and which is carried through the tunnel and discharged at the opposite end thereof is very liable to cool unduly before it reaches the exit end of the tunnel and there will not be a sufficiency of the dry, heated air applied to the fruit to carry off the moisture therefrom. Furthermore, these tunnels are not provided with means whereby the heated air may be moistened so as not to burn the fruit, toughen it and consequently prevent the proper dehydration of the fruit. Furthermore, these tunnels are not provided with effective means whereby the sliced fruit, vegetables or other matter can be submitted to the action of steam to thereby cause the swelling of the fruit, the expansion of the capillaries, and the sweating of the fruit.

The general object of my invention is to improve upon dehydrators of this character by providing means whereby a current of heated air shall be forced longitudinally along the main tunnel passage in a direction reverse to that of the movement of trucks carrying cut fruits and whereby air may be also carried along beneath the floor of the tunnel and discharged upward against the open trucks carrying the sliced fruit and through the trays upon which the fruit is disposed, and further to provide means whereby the fresh heated air may be discharged at intervals through the side walls of the tunnel and against the sides of the tray supporting racks and into the spaces between said trays, and provide means whereby the discharge of air through these auxiliary passages beneath and at the sides of the main tunnel may be controlled and whereby the discharge of air through the main tunnel may be controlled.

A further object is to provide means whereby the air prior to its discharge into the main tunnel may be moistened so that it shall have a predetermined moisture content to thus avoid burning or checking the material on the trays.

A still further object is to provide means whereby the sliced fruits or vegetables on the trays may be submitted to the action of steam under pressure prior to their treatment by the heated air blast or current traveling through the tunnel.

Another object is to provide a chamber within which the rack supporting trucks carrying the fruit or vegetables may be disposed, means being provided within this chamber for submitting the material carried on the racks of the truck to the action of steam under pressure, and provide means whereby the steam used therein may be exhausted into the tunnel and so carried off without this steam being discharged into the work room wherein the fruits, vegetables or like material are initially prepared.

Other objects will appear in the course of the following description.

My invention is illustrated in the accompanying drawings, wherein:—

Figure 1 is a longitudinal horizontal sectional view of a dehydrating tunnel and sweating chamber constructed in accordance with my invention;

Figure 2 is a longitudinal sectional view through the dehydrating tunnel;

Figure 3 is a section on the line 3—3 of Figure 1;

Figure 4 is a fragmentary section on the line 4—4 of Figure 1;

Figure 5 is a fragmentary enlarged vertical section through one of the side walls of the tunnel;

Figure 6 is a fragmentary section through the floor of the tunnel showing one of the controlling valves for the floor openings;

Figure 7 is a detail view of the holding means for the valve adjusting rods, the wall of the tunnel being shown in section;

Figure 8 is an enlarged fragmentary vertical longitudinal section through the heating coils at the air inlet end of the tunnel and showing in section the valves and the means for operating the valves;

Figure 9 is a diametric section through the sweating chamber.

Referring to the drawings, and particularly to Figures 1 and 2, it will be seen that my dehydrating apparatus comprises a tunnel 10. This tunnel 10 under ordinary circumstances will be some sixty or seventy feet in length and for a certain distance the floor of the tunnel is inclined downward and toward the discharge end of the tunnel, as at 11. The entrance end 12 of the tunnel is open to the outside air and the floor 13 of this entrance end is level, that is horizontal. Preferably there will be a plurality of tunnels disposed side by said and in Figure 1 I have illustrated one complete tunnel and a portion of the next adjacent tunnel, it being understood that all the tunnels are alike. One side wall at the entrance end of the tunnel is formed with a doorway 14 closed by a door 15 which is preferably a vertically shiftable door, though not necessarily so. Opposite this door 14 there is a doorway 16 which leads into the second tunnel of the series and which is also normally closed by a vertically sliding door 17. These doors may be counter-weighted or arranged in any other suitable manner and the particular construction of the doors forms no part of my invention. The counter-weights, as illustrated in dotted lines in Figure 2, are designated 18. The doorway 14 opens into a chamber 19 wherein is disposed the steam treating or bleaching apparatus whose details form the subject matter of a separate application for patent filed February 9, 1922, Serial #535,420.

Opposite the doorway 14 this chamber 19 is formed with a doorway 20 closed by a door 21, this doorway 20 opening into the work room or preparing room where the vegetables, fruits or other material are prepared for treatment by cleaning, slicing, etc. The floor of the chamber 19 is formed with a circular seat 22 of a character more fully disclosed in my co-pending application, and vertically movable within the chamber 19 is an inverted bell 23. This bell is supported by counter-weighted cables and is adapted to be raised and lowered from the exterior of the chamber and contains a steam coil 24 whereby steam may be discharged centrally when the bell is lowered into contact with the floor of the chamber 19. The bell 23 is guided by vertical columns 25.

Disposed within the tunnel 10 and between the doorways 14 and 16 is a turn table 26 having tracks extending at right angles to each other and extending transversely through the tunnel and through the chamber 19 are tracks 27 which intersect the seat 22 for the bell 23. These tracks extend through the doorway 20, thus permitting a truck 28 of the character illustrated in Figure 2 and supporting a series of foraminous trays to be filled within the work room or preparing room and shifted on the tracks 27 into the chamber 19 to a position beneath the bell and then after treatment to be shifted into the tunnel onto the turn table 26.

Extending longitudinally through the tunnel are the track rails 29, and the turn table 26 is adapted to take trucks from the tracks 27 and give them a quarter turn so that they can run onto the tracks 29 and so through the tunnel toward the exit end thereof. Adjacent the exit end the tunnel is provided with the oppositely disposed door openings 30 and 31. The door opening 30 opens into a packing room, while the opening 31 opens into the second tunnel. The opening 30 is normally closed by a door 32 and the opening 31 by a door 33, these doors being preferably sliding doors of the type heretofore referred to. Disposed between the doors 32 and 33 is the turn table 34 having intersecting tracks upon which the tracks 29 discharge, and extending transversely through this exit end tunnel through the openings 30 and 31 are the tracks 35. The trucks, after arriving upon the turn table 34, are given a quarter turn and shifted onto the tracks 35 and thus carried out through the exit 30 to a packing room where the fruit or other matter is packed. By opening the door 33, the trucks from the next adjacent tunnel may also be carried out through the doorway 30 into the packing room. It will be seen that the doors 17 and 33 are normally closed so that one tunnel is completely separated from the other tunnel except when it is necessary to open the doors in order to insert or remove the trucks. It will be noted that after the trucks have passed the level portion 13 in the floor of the tunnel they move onto the inclined portion 11 of the floor and are shifted by gravity toward the exit end of the floor, this exit end being level.

Within the bell 23 there is disposed a steam coil 24 which is connected to a source of steam and when this bell is lowered this steam is discharged by the radial openings against the fruit, vegetables or other materials on the racks. The bell is held closed by mechanism illustrated and described in my co-pending application and the pressure is maintained within the bell while the fruit on the truck is under treatment. When it is desired to shift the truck from the chamber 19 into the tunnel, the operator goes into the chamber 19 through the auxiliary door 36 and opens the door 15. He then closes the door 36 and operates the manually actuatable means for raising the bell, which is illustrated in my other application. When the bell is raised the steam that has accumulated within the bell is discharged through the doorway 14 into the tunnel and is carried out at the exit end of the tunnel along with the current of warm air that is passing through the tunnel in the direction of the arrows. After the steam has passed out of the chamber 19, the operator enters the chamber and shifts the truck therein into the tunnel and onto the turn table 26, rotates the turn table to carry the truck onto the tracks 29, and then shifts the truck into the downwardly inclined portion of the tunnel, where it rolls down and against the next adjacent truck and so travels down the inclined tunnel toward the exit end until it reaches the turn table 34.

Beyond the entrance end of the channel I provide a power driven, rotatable fan 37 mounted in bearings 38 and driven in any suitable manner, as by means of the belt 39 operating over a pulley on the shaft 40 which extends out through the end wall of the tunnel and is geared to a driving shaft 41. The chamber 42 within which the fan operates extends, it will be seen, below the level of the turn table 34 and the floor immediately surrounding the turn table. Disposed below the floor of the turn table and the adjacent floor 34$^a$ of the tunnel and extending longitudinally for any desired distance on a level below this floor are the medial ducts 43 and the laterally disposed ducts 44. These three ducts are disposed between that portion of the tunnel having the turn table 26 and that portion of the tunnel having the turn table 34, and these three ducts start just forward of the turn table 34. Beneath the turn table 34 there is a space 45 which opens at its rear end into the fan chamber 42 so that the fan 42 drives air through the main tunnel above the floor thereof and through the space 45 and into the ducts 43 and 44 at the same time. At the entrance to the space 45 there is disposed a valve 47 which extends entirely across the tunnel slightly below the floor of the turn table which is hinged at 46 by its rear edge to the floor of the tunnel and which is connected at its free end to an adjusting rod 48. This rod is toothed along one face and passes through a thimble 49 having a lug 50 engageable with the teeth of the rod. This thimble is large enough to permit the rod to shift away from the lug 50, and in order to hold the rod against the lug 50 I provide the detachable wedge 51. This detail is illustrated in Figure 7.

By this means the valve 47 may be raised from the full line position in Figure 2 to the dotted line position or depressed to the dotted line position across the passage 45, in which case it will tend to prevent the flow of hot air through passage 45 and so to the ducts 43 and 44. The medial duct 43 is provided with openings 52 extending through the floor of the tunnel, and in advance of each of these openings 52 there is disposed a forwardly inclined deflector plate 53, hinged to which is a valve 54. This valve is pivoted to a link 55, in turn pivoted to a link 56 which at its lower end is pivoted to any suitable support, and these toggle links 55 and 56 at their joint are connected to a connecting rod 57 which extends longitudinally along the duct 43 and connects to an arm 58 projecting from a shaft 59. This shaft extends laterally and is provided with an arm 60, in turn connected to an operating rod 57$^a$ which extends rearward and is provided with any suitable means whereby it may be held in adjusted position. The lateral ducts 44 discharge into the vertical ducts 61 formed between the vertical beams 62 of the side walls of the tunnel, these vertical ducts 61 having, as illustrated in Figure 3, openings 63 discharging into the tunnel, and each opening being controlled by a pivoted valve 64, as illustrated in Figure 5, these valves being connected at their inner ends to a common operating cable 65 passing over a drum 66 mounted upon the shaft 67. The cable is weighted at its lower end, as at 68, and the shaft 67 is adapted to be operated by means of a hand wheel 69.

The rear end of the tunnel is connected by a flue 70 to a furnace of any suitable character or to any suitable air heating device which discharges into the rear end of the tunnel rearward of the fan 37. Inasmuch as it is oftentimes desirable to moisten the air entering from the furnace and thus temper this air, I have provided at that end of the tunnel adjacent the furnace and rearward of the fan blade 37 the steam pipe coils 71 arranged with transversely extending steam pipes 72 which are perforated, as at 73, (see Figure 1) so that jets of steam may be discharged into the air current. The passage of steam from these jets may be controlled by any suitable valve, such as the valve 73 illustrated in Figure 1, and thus the incoming dry, heated air may be moistened to any desired degree. This is a very important feature of my construction, as otherwise the dry, hot air coming from the furnace would tend to dry the fruit too quickly and cause it to check and crack. By this means the humidity of the air passing longitudinally through the main portion of the tunnel and through the ducts 43 and 44 may be always controlled. The amount of air passing into the tunnel may also be controlled by valves 75 (see Figure 8). These valves are fulcrumed at 79 above horizontally disposed, transversely extending plates 80 which are supported upon the frame of the radiator. The rear ends of the valves are pivotally connected to an operating rod 81 which extends upward through an opening in the top wall of the tunnel and is held in its adjusted position by the same means as that illustrated for supporting the rod 47 in its adjusted position, that is the means illustrated in detail in Figure 7. By this means, the valves may be shifted from the position shown in dotted lines in Figure 8 to the position shown in full lines in Figure 8 or vice versa, or when the valves are in the position shown in full lines in Figure 8 they will bear at their inner ends against the pipe coils and at their forward ends against the plates 80 and prevent the passage of hot air into the tunnel. Of course, these valves are never intended to be fully closed but are intended to be adjusted so as to control the amount of air passing into the tunnel from the furnace. The passage of air from the space 45 below the turn table 34 into the ducts 43 and 44 is controlled by a pair of valves 82 (see Figure 1), these valves being pivoted to the rear ends of the walls of duct 43 and being shiftable to the position shown in dotted lines in Figure 1 by means of the toggle links 83 which are pivoted to the valves and to each other and connected to a link 84, in turn connected to a lever 85 which is operated by means of an operating rod 86. When the link 83 is pulled rearward, the links 83 will force the valves 82 partially across the ducts 44 and as a consequence more air will pass into the duct 43. If, on the other hand, the toggle links are forced further inward beyond the position shown in Figure 1, they will draw the valves 82 into a rearwardly convergent relation and increase the supply of air to the lateral ducts 44 and reduce the supply of air to the middle duct 43. When the valves are in parallel position, as illustrated in Figure 1, they will cause a uniform distribution of air to the three ducts 43 and 44.

The ducts 43 and 44 are particularly valuable for the reason that they act to reinforce the hot air passing through the main tunnel 10. The air passing through this main tunnel 10 after it leaves the fan 37 will come in contact with the racks of fruit which are disposed one after another along the entire length of the tunnel and as a consequence the air will lose its heat and will take up moisture from the fruit. It is desirable, therefore, to supply dry, warm air to the tunnel along its length to compensate for this reduction in temperature and increase in moisture, and further it is desirable to provide means whereby the air may be directed upward beneath the racks so that it will rise through the perforated or reticulated trays and also discharge air laterally for the full height of the racks so that the hot air will come in contact with every bit of the fruit.

By my construction the hot air passes along the tunnel in a continuous current. The hot air also is discharged upward in regulatable quantities from the bottom of the tunnel and hot air is also discharged laterally from both walls of the tunnel against the racks. This construction also prevents any stratifying of the air. For instance, if hot air is discharged merely along the length of the tunnel, this hot air tends to stratify, the warmer air rising to the upper portion of the tunnel and the cold, damp air falling to the lower portion of the tunnel. As a consequence, those products which are carried upon the uppermost trays are subjected to a greater heat and drying action than the products which are carried upon the lower trays. By the construction which I have described, this is avoided as the hot air discharged from the middle duct 43 is discharged directly upward against the trays and rises through these trays while, of course, moving forward at the same time, and the lateral ducts discharge air along the whole height of the rack laterally against the trays. Thus a uniform diffusion of heated air is secured which secures a uniform drying of the fruit. Furthermore, it will be noted that this drying of the fruit may be readily controlled by the several valves which have been described.

Of course, it will be understood that the trucks supporting the racks carrying the trays will proceed by gravity one after another upon the inclined portion of the tunnel and that as each truck arrives upon the turn table 34 the door 32 is opened and the truck discharged into the packing room and, of course, it will be seen that the fruit is more or less progressively heated, that is it is subjected to a gradually hotter and hotter temperature as it passes along the tunnel and nears the fan 37. On the other hand, however, the material on the trays is not chilled when it is carried from the steam chamber into the tunnel but the heat is kept high enough by means of the ducts 43 and 44 at the entrance end of the tunnel so that equal drying is secured. Thus in the ordinary operation of the tunnel the heat at the entrance end of the tunnel, that is, for instance, adjacent the turn table 26, will be approximately 130° while at the exit end of the tunnel, as for instance the turn table 34, the heat will be about 160°.

If the racks containing the fruit or vegetables are moved from a steam chamber into a tunnel where the heat is too low, the capillaries of the fruit are at once closed and the result is that quick drying is prevented. Under these circumstances the fruit will have no more flavor and will expand no more when put in water than ordinary commonly dried fruit. The fruit or vegetables will not return to their original condition when placed in water and will not absorb the same amount of water they had when fresh. If, on the other hand, the fruit be brought from the steaming chamber into the tunnel and immediately subjected to a temperature of, say 130° more or less, the capillaries will not be closed, the fruit will still remain in its expanded condition, and the heated air will have free access to the interior of the fruit, drying the fruit uniformly and gradually and preventing the fruit or vegetables becoming hard on the exterior while water still remains in the interior of the fruit. By placing steam pipes at the rear end of the tunnel immediately behind the air projecting fan, the air in the entire length of the tunnel is rendered humid, thus conforming to the requirement laid down by experts today that dehydration must be accomplished in a damp, heated atmosphere and that dry heat will not secure the proper dehydration of the material. It has been proposed to lower coils of pipe through the roof of the tunnel at intervals and at intervals subject the material on the trays to the action of sprays of water or steam. This has not been found effective, however, nor practical. It tends to prevent the continuous movement of the trucks along the tunnel and the action is too unequal.

I claim:—

1. A fruit and vegetable dehydrating plant including a tunnel, means for causing a current of heated air to traverse the tunnel in one direction from end to end, a steam coil disposed at that end of the tunnel into which the air enters and adjacent the walls thereof and having apertures directed toward the axial center of the tunnel.

2. A dehydrating plant including a tunnel, an air duct extending longitudinally beneath the tunnel and opening into the bottom thereof, air ducts on each side of the tunnel and opening into the tunnel through the side walls thereof, and means for causing heated air to traverse said tunnel and air ducts in one direction.

3. A dehydrating plant including a tunnel, an air duct extending longitudinally beneath the tunnel and opening into the bottom thereof, air ducts on each side of the tunnel and opening into the tunnel through the side walls thereof, and means for controlling the passage of air through said tunnel and air ducts.

4. A dehydrating plant including a tunnel, an air duct extending longitudinally beneath the tunnel and opening into the bottom thereof, air ducts on each side of the tunnel and opening into the tunnel through the side walls thereof, means for controlling the passage of air through said tunnel, and independent means for controlling the passage of air through the ducts.

5. A dehydrating plant including a tunnel, means for causing a current of heated air to traverse the tunnel in one direction from end to end, and means for directing currents of heated air into the tunnel at a number of points along its length.

6. A dehydrating plant including a tunnel, means for causing a current of heated air to enter the tunnel at one end and pass longitudinally through the tunnel, means for moistening the air as it enters the tunnel, and means for discharging heated air into the tunnel at different points along its length.

7. A dehydrating plant including a tunnel, an air duct extending beneath the tunnel and opening at intervals through the floor thereof, valves controlling the passage of air from the air duct into the tunnel, and means for causing a current of heated air to pass longitudinally through the tunnel and through the air duct in one direction.

8. A dehydrating plant including a tunnel, air ducts disposed on each side of the tunnel and opening into the tunnel through vertical series of openings extending longitudinally of the tunnel, and manually controlled valves controlling the passage of air to said openings into the tunnel.

9. A dehydrating plant including a tunnel connected at one end to an air heating means, means at the entrance end of the tunnel for discharging moisture into the air current passing through the tunnel, a rotatable fan disposed at the entrance end of the tunnel in advance of said air moistening means, and air ducts opening into the tunnel forward of the fan and extending parallel to the tunnel for the greater portion of its length and having openings discharging into the tunnel.

10. A dehydrating plant including a tunnel connected at one end to an air heating means, means at the entrance end of the tunnel for discharging moisture into the air current passing through the tunnel, a rotatable fan disposed at the entrance end of the tunnel in advance of said air moistening means, and air ducts opening into the tunnel forward of the fan and extending parallel to the tunnel for the greater portion of its length and having openings discharging into the tunnel, through the floor and side walls thereof.

11. A dehydrating plant including a tunnel connected at one end to a source of heated air and having means for causing the passage of the heated air longitudinally through the tunnel, a medial air duct and lateral air ducts disposed beneath the floor of the tunnel and extending longitudinally thereof and receiving heated air from said fan, the medial tunnel having valved openings through the floor of the tunnel, lateral air ducts on each side of the tunnel and with which the first named lateral air ducts communicate, the second named lateral air ducts having valved openings discharging into the tunnel at different levels, and manually controllable means at the entrance ends of said ducts whereby the discharge of air into the medial and lateral ducts may be controlled.

12. A dehydrating tunnel having a truck entrance opening at one end and a truck exit opening at the other end, doors for said openings, turn tables disposed opposite the said doors, a track extending longitudinally of the tunnel and adapted to receive the material carrying trucks, means for discharging heated air into that end of the tunnel adjacent the exit door, a fan chamber formed in the tunnel adjacent the exit door and having a rotary fan, the rotary fan discharging into the main body of the tunnel and into the space between the floor of the tunnel opposite the exit door, a medial air duct and lateral air ducts opening in the space between the turn table opposite the exit door and receiving heated air from said space, valves opening from said medial duct through the floor of the tunnel, vertical, lateral ducts in the walls of the tunnel receiving air from the first named lateral ducts and having valved openings discharging at different levels into the tunnel, manually controllable means for controlling the discharge of air into the space beneath the floor of the said turn table, and manually controlled means for controlling the discharge of air from said space into said air ducts.

13. The combination with a dehydrating tunnel, of a chamber opening into the tunnel and adjacent its entrance end, said chamber having a door controlling passage into the tunnel and a door controlling passage into the chamber, a vertically movable steaming bell disposed within said chamber, and means for discharging steam into the interior of the bell when the latter is lowered.

14. A dehydrating plant including a tunnel connected at one end to a source of heated air and having means whereby a current of the heated air may be caused to traverse the tunnel from end to end, steam pipes extending across that end of the tunnel into which the heated air is admitted and having perforations discharging into the the tunnel, and valves manually shiftable to control the discharge of heated air into the tunnel.

15. A dehydrating plant including a tunnel connected at one end to a source of heated air and having means whereby a current of the heated air may be caused to traverse the tunnel from end to end, a series of steam pipe coils arranged within the tunnel adjacent the point where the heated air enters, transverse pipes connected with said coils and having perforations, horizontal partitions supported upon said steam pipes, and manually actuatable valves coacting with said partitions to close passage into said tunnel through the steam pipes.

In testimony whereof I hereunto affix my signature.

JOHN H. ELSPASS.